United States Patent [19]

Zider et al.

[11] Patent Number: 4,895,438

[45] Date of Patent: Jan. 23, 1990

[54] EYEGLASS FRAME INCLUDING SHAPE-MEMORY ELEMENTS

[75] Inventors: Robert B. Zider, Portola Valley; John F. Krumme, Woodside, both of Calif.

[73] Assignee: CVI/Beta Ventures, Inc., Menlo Park, Calif.

[21] Appl. No.: 200,831

[22] Filed: Jun. 1, 1988

Related U.S. Application Data

[63] Continuation of Ser. No. 876,077, Jun. 19, 1986, Pat. No. 4,772,112, which is a continuation-in-part of Ser. No. 676,823, Nov. 30, 1984, abandoned, which is a continuation-in-part of Ser. No. 558,604, Dec. 6, 1983, abandoned.

[51] Int. Cl.$^4$ .......................... G02C 1/00; G02C 5/16
[52] U.S. Cl. ...................................... 351/41; 351/106; 351/114; 351/153
[58] Field of Search .................. 351/41, 86, 106, 111, 351/114, 117, 121, 153, 154

[56] References Cited

U.S. PATENT DOCUMENTS

| | | | |
|---|---|---|---|
| 1,457,608 | 6/1923 | Schumacher | 351/102 |
| 1,461,071 | 7/1923 | Schumacher . | |
| 1,479,936 | 1/1924 | Stevens | 29/20 |
| 1,609,110 | 11/1926 | Brown | 29/20 |
| 1,613,202 | 1/1927 | Schumacher | 351/102 |
| 1,637,029 | 7/1927 | Schumacher . | |
| 1,708,135 | 4/1929 | Harper | 215/246 |
| 1,785,929 | 12/1930 | Bouchard | 351/83 |
| 1,845,582 | 2/1932 | Courtright | 351/116 |
| 2,169,235 | 8/1939 | Foster | 351/116 |
| 2,192,208 | 3/1940 | Stevens . | |
| 2,210,507 | 8/1940 | Spill | 351/116 |
| 2,305,562 | 12/1942 | Thompson et al. . | |
| 2,379,928 | 7/1945 | Rosenheim . | |
| 2,510,358 | 6/1950 | Wolf . | |
| 2,585,352 | 2/1952 | Silverman . | |
| 2,768,475 | 10/1956 | Seelen et al. | 29/447 |
| 2,994,933 | 8/1961 | Wolfe | 411/909 |
| 3,156,756 | 11/1964 | Seaver . | |
| 3,162,933 | 12/1964 | Trax et al. | 29/447 |
| 3,243,211 | 3/1966 | Wetmore | 403/28 |
| 3,320,106 | 5/1967 | Kirkpatrick et al. . | |
| 3,569,901 | 3/1971 | Connor | 411/909 |
| 3,582,457 | 6/1971 | Barthell . | |
| 3,597,053 | 8/1971 | Mastman | 351/41 |
| 3,619,478 | 11/1971 | Staiger | 174/68.5 |
| 3,622,941 | 11/1971 | Wetmore | 339/98 |
| 3,709,587 | 1/1973 | Wick | 351/106 |
| 3,711,134 | 1/1973 | Goldberg | 287/100 |
| 3,725,972 | 4/1973 | McCabe | 16/48.5 |
| 3,727,173 | 4/1973 | Goldmann et al. | 339/74 R |
| 3,740,839 | 6/1973 | Otte et al. | 29/628 |
| 3,744,887 | 7/1973 | Dunbar | 351/153 |

(List continued on next page.)

FOREIGN PATENT DOCUMENTS

| | | |
|---|---|---|
| 3209508A1 | 12/1982 | Fed. Rep. of Germany . |
| 2388293 | 12/1978 | France . |
| 52-46843 | 4/1977 | Japan . |
| 56-08111 | 3/1979 | Japan . |
| 54-63849 | 5/1979 | Japan . |
| 54-163052 | 12/1979 | Japan . |
| 55-48725 | 4/1980 | Japan . |
| 56-70520 | 6/1981 | Japan . |
| 56-89715 | 7/1981 | Japan . |
| 56-89716 | 7/1981 | Japan . |
| 56-89717 | 7/1981 | Japan . |
| 56-94321 | 7/1981 | Japan . |
| 56-95214 | 8/1981 | Japan . |
| 56-95215 | 8/1981 | Japan . |
| 56-99317 | 8/1981 | Japan . |
| 56-153317 | 11/1981 | Japan . |
| 57-115517 | 7/1982 | Japan . |

Primary Examiner—Rodney B. Bovernick
Assistant Examiner—Jay Patrick Ryan
Attorney, Agent, or Firm—Burns, Doane, Swecker & Mathis

[57] ABSTRACT

Eyeglass frames fabricated from shape-memory alloys which have optimized elastic properties, which exhibit a combination of shape-memory and elastic properties, which utilize the shape-memory property of these alloys in fastening elements or which utilize the flexibility and fatigue resistance of the martensite state of the alloys as a hinge element.

7 Claims, 4 Drawing Sheets

U.S. PATENT DOCUMENTS

| | | | |
|---|---|---|---|
| 3,783,429 | 1/1974 | Otte | 337/393 |
| 3,816,902 | 6/1974 | Beer | 29/446 |
| 3,832,603 | 8/1974 | Cray et al. | 317/101 D |
| 3,913,444 | 10/1975 | Otte | 85/8.3 |
| 3,923,237 | 12/1975 | Bostrom et al. | 229/43 |
| 3,998,513 | 12/1976 | Kobayashi et al. | 339/59 M |
| 3,999,790 | 12/1976 | Rogen | 292/201 |
| 4,169,309 | 10/1979 | Meginnis | 29/447 |
| 4,206,537 | 6/1980 | Meginnis | 29/447 |
| 4,236,281 | 12/1980 | Bottum | 24/115 R |
| 4,237,609 | 12/1980 | Clabburn et al. | 29/859 |
| 4,244,488 | 1/1981 | Fridl et al. | 220/260 |
| 4,293,942 | 10/1981 | Baumgartner | 368/280 |
| 4,294,559 | 10/1981 | Schutzler | 403/28 |
| 4,297,779 | 11/1981 | Melton et al. | 29/446 |
| 4,345,848 | 8/1982 | Cheselka | 403/157 |
| 4,412,872 | 11/1983 | Albrecht et al. | 148/11.5 F |
| 4,462,651 | 7/1984 | McGaffigan | 339/30 |
| 4,472,035 | 9/1984 | Takamura et al. | 351/41 |
| 57-115518 | 7/1982 | Japan . | |
| 57-178215 | 11/1982 | Japan . | |
| 58-179818 | 10/1983 | Japan . | |
| 58-179819 | 10/1983 | Japan . | |
| 59-136619 | 9/1984 | Japan . | |
| 60-22117 | 2/1985 | Japan . | |
| 60-93414 | 5/1985 | Japan . | |
| 60-168123 | 11/1985 | Japan . | |
| 338475 | 4/1930 | United Kingdom . | |
| 1156162 | 2/1980 | United Kingdom . | |
| 1579734 | 11/1980 | United Kingdom . | |
| 2095480A | 9/1982 | United Kingdom . | |

OTHER PUBLICATIONS

Schetky, L. McDonald, "Shape-Memory Alloys", *Encyclopedia of Chemical Technology.*

EYEGLASS FRAME INCLUDING SHAPE-MEMORY ELEMENTS

This application is a continuation of U.S. patent application Ser. No. 876,077, filed June 19, 1986 now U.S. Pat. No. 4,772,112 which is in turn a continuation-in-part of U.S. patent application Ser. No. 676,823, filed Nov. 30, 1984, now abandoned, which is in turn a continuation-in-part of U.S. patent application Ser. No. 558,604, filed Dec. 6, 1983, now abandoned.

FIELD OF THE INVENTION

The present invention relates to frames for eyeglasses and more particularly to frames fabricated from shape-memory alloys.

BACKGROUND OF THE INVENTION

The metals which have historically been used to make metal eyeglass frames have usually been chosen in large part for their ease of fabrication. Metals such as nickel-silver, monel, and phosphor bronze have fairly high yield strength but quite low work-hardening which allows them to accept large deformations during manufacture. In use, however, they tend to bend rather suddenly and in quite localized sections if their yield strength is exceeded. Such sharp bends are very difficult to remove without leaving "kinks" in the bent section. The higher strength frame materials, such as high strength stainless steels and beryllium-copper, are able to withstand much higher elastic strains without permanent deformation. They are still limited to only about 1% elastic strain, however, and if their yield strength is exceeded a bend is formed which is difficult to remove.

A number of references such as U.S. Pat. No. 4,472,035, Japanese Patent Publication No. 57115517(A) and Japanese Pat. No. JP-084714 have suggested the use of shape-memory alloys, especially the nickel-titanium alloys, for use as frame components due to their "super-elastic" or "pseudo-elastic" properties. Although these terms are often mistakenly used interchangeably, they refer to two distinctly different properties of the alloys. Careful study of all of these references, specifically U.S. Pat. No. 4,472,035 and Japanese Pat. No. JP-084714 shows that the elastic property cited is the "pseudoelastic" property of shape-memory alloys. This pseudoelasticity occurs in a limited temperature range slightly above the stress-free austenite to martensite transformation temperature. It involves the creation of stress-induced martensite which simultaneously undergoes strain as it forms to relieve the applied stress. As soon as the applied stress is removed, the thermally unstable martensite reverts back to austenite and the strain spontaneously returns to zero. This behavior gives a very high apparent elasticity to the material without inducing any permanent strain but is narrowly limited in the temperature range where it can be utilized in a given alloy. Because the pseudoelasticity depends on behavior within a narrow portion of the transformation temperature spectrum, lowering the temperature as little as 10° C. may change the behavior to normal shape memory. In this case a deformed component will remain deformed unless it is heated. Also, the yield strength of this alloy, if it is annealed to give good pseudoelastic properties, is too low at low temperatures to function as a satisfactory component. Conversely, if the pseudoelastic component is heated by as little as 10° C. the amount of pseudoelastic strain is significantly reduced. At even higher temperatures the pseudoelasticity is eliminated because the stress needed to stress induce the martensite exceeds the yield strength of the austenite and permanent deformation results. Thus, the effective useful temperature range for purely pseudoelastic components may be as little as 20° C. This range is too narrow to serve as eyeglass frames which must function from winter days as cold as −20° C. to hot sunny days with possible temperatures over 40° C.

Thus, while both the elastic properties and memory properties of shape-memory alloys have been discussed as potentially useful in eyeglass frames, it is clear that previous workers have not fully understood the limitations on the use of these materials nor have they revealed any information on the proper thermo-mechanical processing necessary to utilize the alloys as frame components.

SUMMARY OF THE INVENTION

It is the purpose of the instant invention to provide eyeglass frames, which (1) are highly resistant to permanent deformation, or "kinking", over the full range of ambient temperatures, or (2) are sufficiently resistant to deformation and are readily restorable to the undeformed shape by heating, or (3) are easily disassembled and reassembled, or (4) do not require screws in the hinges.

To accomplish this purpose there is provided frames having portions thereof fabricated from shape memory alloys which (1) have the combination of super-elastic and work-hardened pseudo-elastic properties, hereinafter "optimized elastic", or (2) exhibit a combination of shape-memory and super-elastic properties, or (3) utilize the shape-memory property of these alloys in fastening elements, or (4) utilize the flexibility and fatigue resistance of the martensite state of the alloys as a hinge element.

In one aspect of the invention, there is provided an eyeglass frame having at least a portion thereof fabricated from shape-memory alloy work-hardened at least 30% and having greater than 4% elasticity over a temperature range from −20° C. to +40° C.

In another aspect of the invention, there is provided an eyeglass frame comprising at least a portion thereof fabricated from shape-memory alloy work-hardened at least 20% followed by a heat treatment at a temperature not exceeding 400° C. for not less then one hour and having a minimum of 3% heat-recoverable shape-memory, a yield strength greater than 30,000 psi and at least 3% elasticity.

In yet another aspect of the invention, there is provided an eyeglass frame having at least one fastener portion, said fastener portion made of shape-memory alloy with a martensite transformation temperature below ambient temperature, said alloy having an austenite transformation temperature above which the alloy transforms to its austenite state and in so doing applies a fastening or unfastening force.

Still in yet another aspect of the invention, there is provided an eyeglass frame having a pair of rims and a pair of corresponding temples, said rims connected to said temples by a pair of hinge portions, said hinge portions made of shape memory alloy with an austenite transformation temperature above ambient temperature, below said austenite transformation temperature said alloy being in its martensite state which is highly flexible and resistant to fatigue.

BRIEF DESCRIPTION OF THE DRAWINGS

FIGS. 2b–2e represent the stress-strain behavior of a fully annealed shape-memory alloy at four different temperatures wherein:

FIG. 2b - the temperature $T_1$ is below $M_s$;

FIG. 2c - the temperature $T_2$ lies slightly above $M_s$;

FIG. 2d - the temperature $T_3$ is higher than $T_2$ but still below $M_d$;

FIG. 2e - the temperature $T_4$ is greater than $A_f$ and greater than $M_d$;

FIG. 12 is a partial perspective view of a fastening arrangement employing a shape-memory nut and/or bolt.

FIGS. 13 and 14 are the front view and a partial cross-sectional side view, respectively, showing the coupling of the nose bridge and temples to the lenses of the eyeglasses. FIG. 14 illustrates an alternate lens interface.

FIG. 15 is a perspective view of a shape memory alloy rim which both engages a lens and pivotally engages a temple upon heat recovery.

FIG. 16 is a partial perspective view of a support for a nose pad for use in the present invention.

FIG. 17 is a partial perspective view of a one piece hinge in accordance with the present invention.

FIG. 18 is a cross-sectional view of a temple employed in the present invention.

DESCRIPTION OF THE PREFERRED EMBODIMENTS

Figure 1:
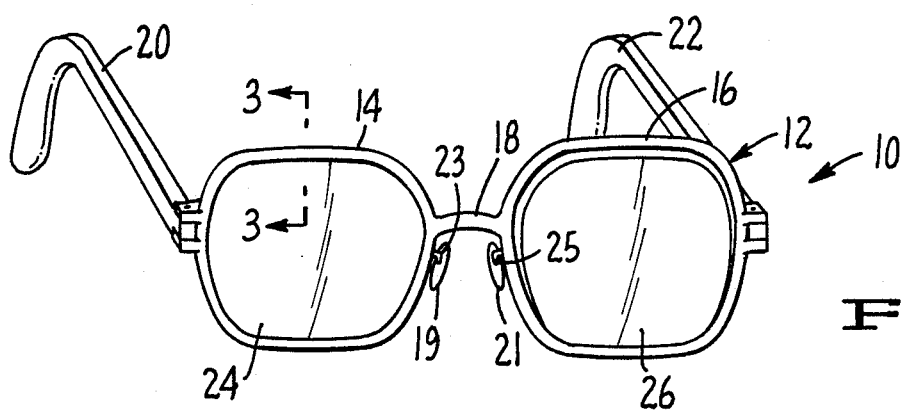
FIG. 1 is a perspective view of a generic eyeglass frame including detail with respect to one embodiment of the invention.

Referring to FIG. 1, eyeglasses shown generally at 10 are shown having a frame 12. The frame 12 includes two eyeglass rims 14 and 16, a nose bridge 18, nose pads 19 and 21 and temples 20 and 22 which are hinged to the rims 14 and 16, respectively. The temples 20 and 22 extend back over the ears of the wearer (not shown), the bridge 18 joins the two lenses, and the nose pads, which rest on the nose of the wearer, are attached to the rims by wires 23 and 25.

Figure 2A:
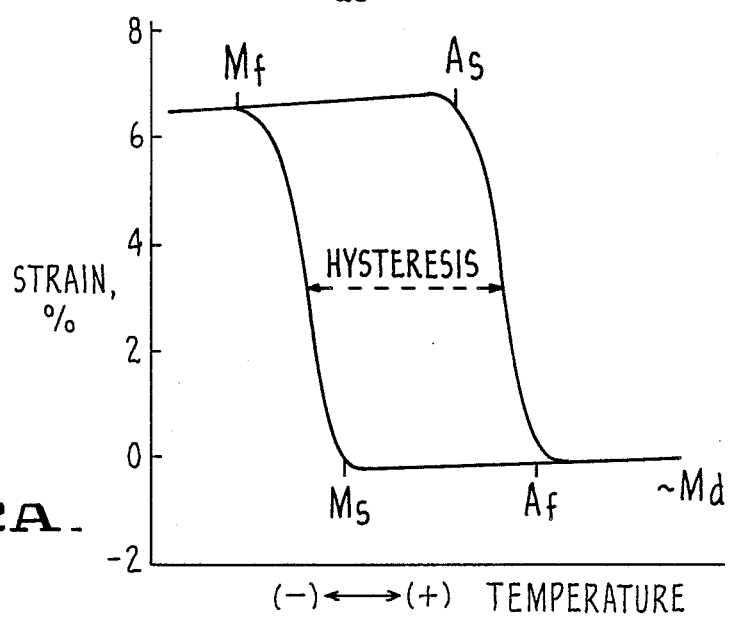
FIG. 2a is a graph of strain versus temperature at a fixed applied stress. The temperatures which characterize the transformation between austenite and martensite phases of a shape-memory alloy are defined on the graph.

The mechanical properties of shape-memory alloys are very dependent on processing and on temperature, particularly in the temperature range around the transformation temperatures depicted in FIG. 2a.

To characterize the mechanical properties of frame components, the uniaxial tensile properties will be cited because they are the most easily tested and compared to other materials or other results. To test the frame components in question, the straight blade of the temples with uniform cross-section were pulled in a standard testing machine while strain was measured using an extensometer fastened to the actual test section under study.

In FIG. 2a the strain, $\epsilon$, that the alloy undergoes when subjected to a fixed stress, $\sigma$, is plotted as a function of temperature. Upon cooling there is a sudden increase in strain when the alloy reaches the martensite start transformation temperature, $M_s$, at which the high temperature structure called austenite begins to transform into the much softer low temperature martensite structure. The increase in strain continues until the alloy is completely converted into martensite at the martensite finish temperature, $M_f$. When the alloy is reheated the transformation back to austenite begins at the austenite start temperature, $A_s$, and is completed at the austenite finish temperature, $A_f$. Generally, $A_s$ is somewhat higher than $M_f$ and the temperature difference between the cooling and heating curves is called hysteresis. The width of the hysteresis can be 10° C. to 100° C. in nickel titanium alloys and even wider in some copper-based alloys.

Figure 2B:
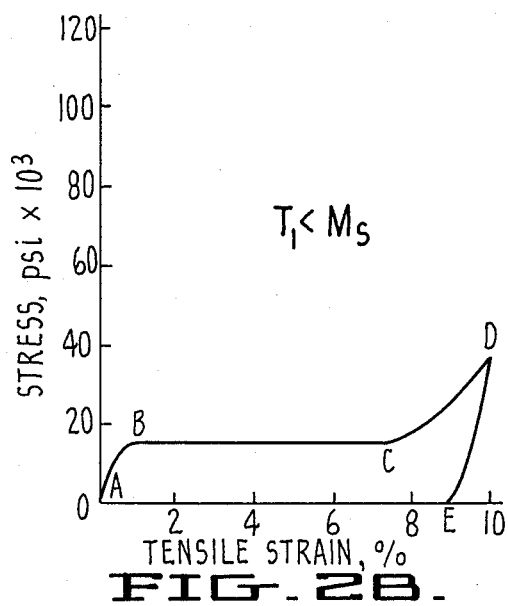
Figure 2C:
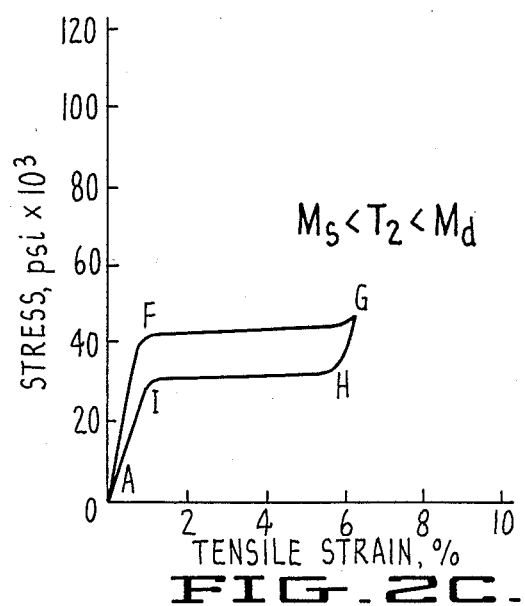
Figure 2D:
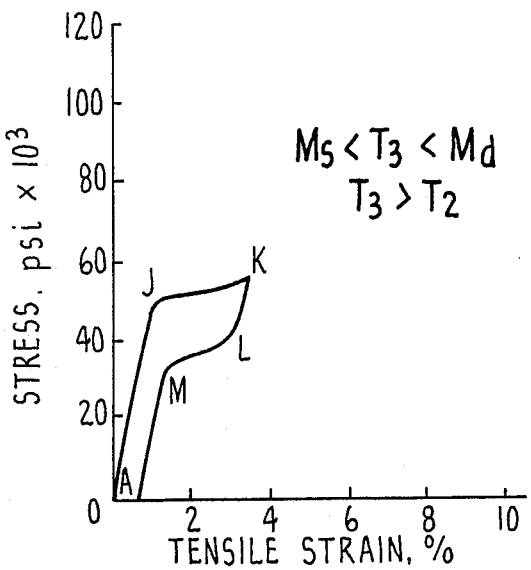
Figure 2E:
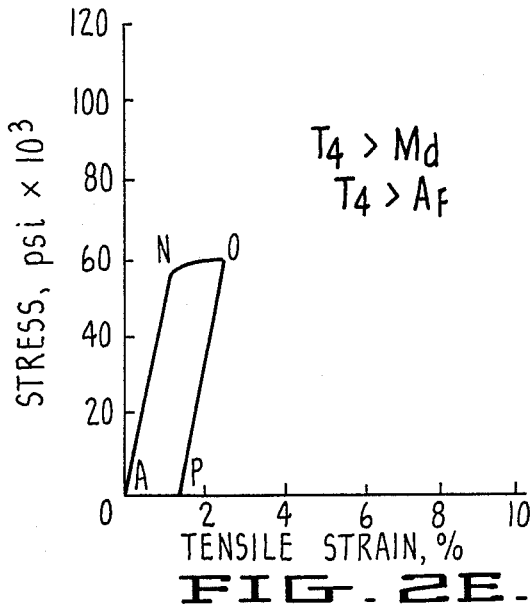
Figure 2F:
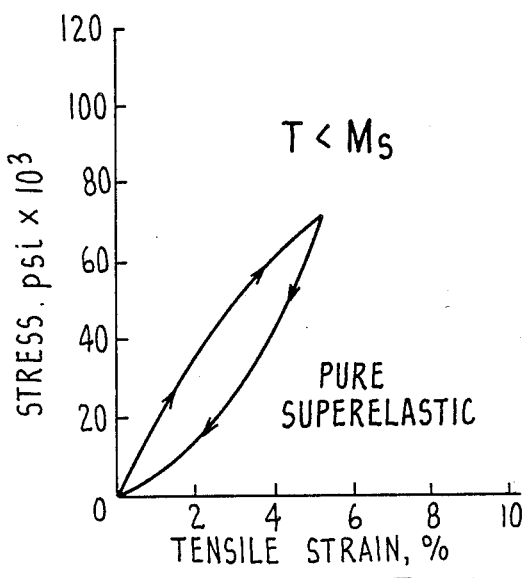
FIG. 2f represents the stress-strain behavior of a work-hardened martensite alloy at $T<M_s$. This is the behavior defined as super-elastic.
Figure 2G:
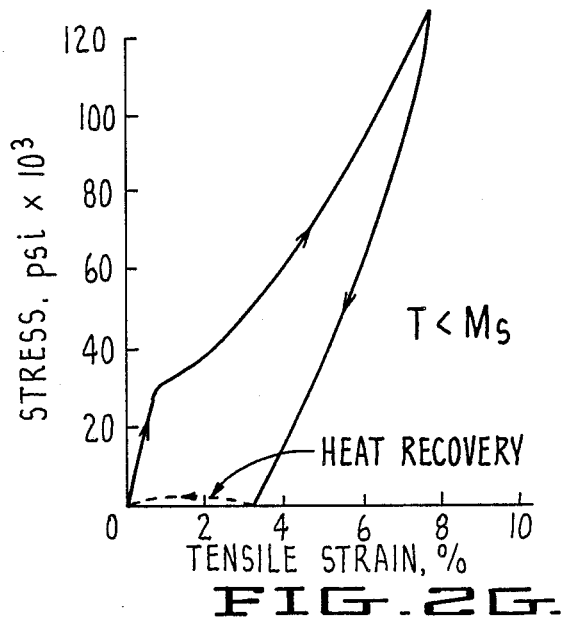
FIG. 2g shows a combination of elastic and shape-memory properties at $T<M_s$.
Figure 2H:
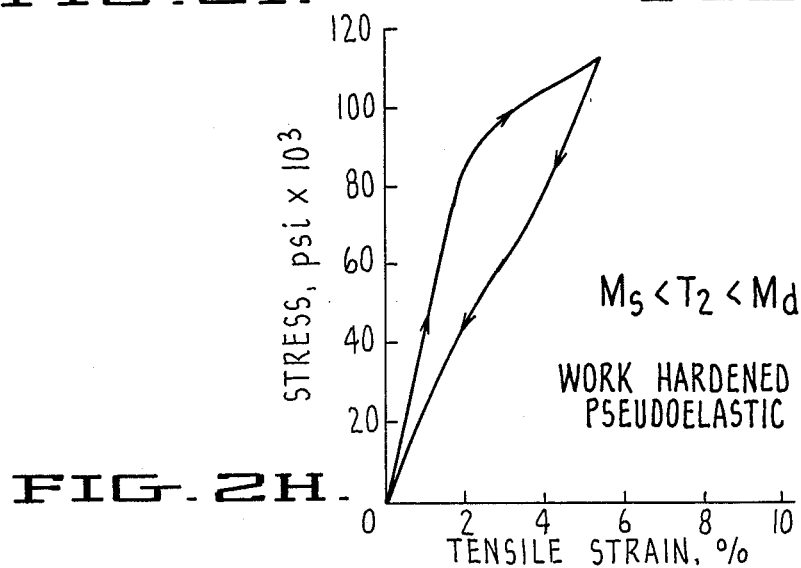
FIG. 2h shows work-hardened pseudoelastic behavior at $M_s<T<M_d$. This behavior is defined as Optimized Elastic.

When the alloy is subjected to work-hardening, a different set of stress-strain curves are obtained. Work-hardening and partial annealing result in an alloy which, below $M_s$, has a combination of very springy elastic behavior and some shape-memory. This behavior is shown in FIG. 2g. At $T>M_s$ the same alloy will behave as shown in FIG. 2h where it is described as work-hardened pseudo-elastic. With even more work-hardening, and no anneal, highly springy behavior, shown in FIG. 2f will occur at $T<M_s$. FIGS. 2f–2h represent the ideal characteristics for use in eyeglass components. Whereas the pseudoelastic behavior in FIGS. 2c is too limited in temperature range to be useful, the behavior in FIG. 2f or FIG. 2h can be achieved throughout the range −20° C. to +40° C. by selecting an alloy with an appropriate $M_s$ temperature and processing the alloy to achieve optimum work-hardening. Should the alloy be exposed to temperatures above $M_s$ the work-hardened pseudoelastic behavior of FIG. 2h will ensure that it retains the desired elasticity and strength.

By carefully work-hardening the frame material to the appropriate level and then retaining this work-hardening after all other processing, it is possible to obtain an extremely "springy" component whose yield strength is acceptably high at all relevant temperatures. At temperatures below the material's $M_s$ temperature, the work-hardened structure will not undergo easy heat-recoverable strain as shown in FIG. 2b, but rather exhibits the behavior shown in FIG. 2g. If the service temperature should fall between $M_s$ and $M_d$ for the alloy, the extreme springiness due to the pseudoelastic effect is partially retained while the resistance to permanent deformation of either the martensite or austenite phases due to the work-hardening is utilized (FIG. 2h). In all of these situations the low effective modulus of the material and the enhanced yield strength due to the correct retained work-hardening make possible components with an elasticity many times that of standard frame materials.

To achieve the desired very high elasticity property throughout the temperature range for eyeglass frame usage (i.e. about −20° C. to +40° C.), it is desirable to combine aspects of both pseudo-elasticity and superelasticity in the components (See FIGS. 2c and 2f). This is achieved by choosing an alloy whose pseudoelastic temperature range matches the upper portion of the desired service temperature range and applying correct work-hardening to achieve satisfactory superelastic behavior in the lower portion of the service temperature range. By applying work-hardening of at least 50% to the component, plastic and heat-recoverable strains in the martensite phase, up to a stress of at least 75 ksi, are suppressed. In the pseudoelastic temperature region the properties then become a combination of superelastic and pseudoelastic, i.e., optimized elastic, properties (See FIGS. 2h) up to stresses of at least 75 ksi. Thus, throughout the temperature region of interest for eyeglass frames the component acts completely elastically up to strains of 6% or more. This is many times that achieved with traditional metal frame materials.

From the above, it can be seen that an eyeglass frame may be fabricated with portions thereof exhibiting optimized elasticity and made from shape-memory alloy work-hardened at least 30% and having greater than 4% elasticity over a temperature range from −20° C. to +40° C.

To utilize the shape-memory feature, especially in such components as temples, it is necessary to achieve a fairly high effective yield strength (not less than about 30 ksi) while still retaining sharp, complete shape-memory recovery from deformations as large as 6% outer fiber strain. This is accomplished by being certain that the final deformation step on the component must apply at least 20% plastic deformation during the forming and then a final heat treatment to reduce the yield strength from the work-hardened value of at least 75 ksi to the heat treated level of 30 ksi to 50 ksi. This sequence should give a fully recoverable strain potential of at least 6%. The optimum processing we have developed employs a final shaping operation which imparts approximately 50% cold work followed by a heat treatment below 400° C. for over one hour which reduces the yield strength to 30,000 to 50,000 psi.

From the above it can be seen that an eyeglass frame may be fabricated having portions thereof made from shape-memory alloy having a minimum of 3% heat-recoverable shape-memory, a yield strength greater than 30,000 psi and at least 3% elasticity.

For components in which one uses the shape memory properties to accomplish fastening or clamping functions, material as described in FIGS. 2b or 2g may be used. The transformation temperature of the material may be chosen to allow cooling to obtain the martensite structure and reversion to austenite would occur upon warming to service temperature or alternatively the material would require heating above the service temperature to cause transformation to austenite and triggering of the memory effect. In service the components might be either austenite or martensite.

From the above it can be seen that an eyeglass frame may be fabricated having at least one fastener portion made of shape-memory alloy with a martensite transformation temperature below ambient temperature, said alloy having an austenite transformation temperature above which the alloy transforms to its austenite state and in so doing applies a fastening force. The alloy may alternatively have a martensite transformation temperature above ambient temperature, such that raising the alloy to its austenite state will apply a fastening force, said fastening force being maintained when the component is cooled in its martensite state.

In components which utilize the flexible fatigue resistant properties of the shape-memory alloys, such as in FIG. 17, the preferred material is the form described by FIG. 2b. The transformation temperature of the alloy should be above the service temperature range to ensure that the component is always martensite in service and therefore has a low martensite yield strength and large, reversible martensite strain. It is also possible, if the component desirably has a higher effective stiffness to use the alloy in the form described by FIGS. 2f, 2g or 2h.

From the above it can be seen that an eyeglass frame may be fabricated having a hinge portion made from shape-memory alloy with an austenite transformation temperature above ambient temperature, below said austenite transformation temperature the alloy being in its martensite state which is highly flexible and resistant to fatigue.

The above described shape-memory alloys are applied but not limited to portions of the eyeglass frame, as follows:

| | |
|---|---|
| (1) Optimized elastic | temples |
| | wires |
| | bridge |
| (2) Elastic & memory | temples |
| | wires |
| | rims |
| | bridge |
| (3) Fasteners (shape-memory only) | hinges |
| | wires |
| | rims |
| (4) Martensite | hinges |

One alloy of the type that may be used to fabricate the above portions of the eyeglass frame is the subject of U.S. Pat. No. 3,351,463, which is incorporated herein by reference. Other literature describing the processing and characteristics of suitable compositions includes an article by Dr. William J. Buehler, the principal developer of the material, and William B. Cross, entitled "55 Nitinol - Unique Alloy Wire," which appeared in the June 1969 issue of *Wire Journal*. A description of the materials and certain of the properties also may be found in the brochure entitled "Nitinol Characterization Studies" dated September 1969. This document, identified as N-69-36367, or NASA CR-1433, is available from the Clearinghouse for Scientific and Technical Information, Springfield, Va. 22151. All of these publications are incorporated herein by reference.

Examples of shape-memory alloys are disclosed in U.S. Pat. Nos. 3,174,851 and 3,672,879, incorporated herein by reference. A titanium-nickel cobalt alloy is disclosed in U.S. Pat. No. 3,558,369. Suitable binary nickel-titanium shape-memory alloys are well known to those skilled in the art and, for example, are described in the patents and article of Buehler et al mentioned above.

In FIG. 1, the rim 14 is shown in a contracted shape (recovered state) wherein the rim 14 abuts a lens 24 and forms a tight fit therewith. Rim 16 depicts an expandable shape (deformed state) rim relative to a lens 26 for insertion of such a lens. In this embodiment the rims 14 and 16 apply a fastening force to the lenses.

The rims 14 and 16 are made of shape-memory alloy material, such as, but not limited to, a nickel-titanium alloy, various aluminum brasses, copper alloys, and other known alloys, that exhibit shape-memory effect. One well known nickel-titanium alloy is known as Nitinol. In this figure, by way of example, the shape-memory alloys may be formed to have a memory configuration to which they return when sufficient heat is generated therein. That is, the shape-memory alloy can be deformed and thereafter returns to its memory configuration when it is heated. This memory characteristic is attributed to changes of state in the metal or alloy from a deformed martensite state to a recovered austenite state in response to heat being applied. The rims 14 and 16 can be deformed while the alloy is in its martensite state and thereafter recovered to a memory configuration, i.e. to its recovered austenite state to apply a fastening force by exposing the rims 14 and 16 to an appropriate temperature. The transition temperatures for shape-memory materials are known in the arts relating to shape-memory alloys. The methods in which the rims 14 and 16 are directed to a transition, or recovery, temperature include: adjusting the temperature of the environment surrounding the rims 14 and 16; passing current through rims 14 and 15 to generate heat due to the resistance of the material; inductive heating; or other temperature control techniques. Preferably, a technique which permits close control of the temperature of the rims 14 and 16 is employed; e.g. dipping in water of proper temperature.

In one mode of operation, the rims are in the recovered austenite state when the lenses are in final position. Rim 14 is shown in memory configuration (recovered) in FIG. 1. In the deformed state, as seen with respect to rim 16 the rim is sufficiently large to enable the lens 24 to be inserted therein. Upon heating, the rim 16 will contract into tight contact with the lens 24 exerting a fastening force. Therefore, in this mode the rim is heated to close upon the lens to retain the lens.

The speed at which the rim 16 contracts may be closely controlled by controlling the application of heat to the rim 16. (This feature, it is noted, pertains to all of the embodiments of the invention as relates to recovery of the metals.)

In another mode of operation, the rim 14 may be in the deformed martensite state when closed and in tight contact with the lens. By heating the rim 14 in this mode the rim in its deformed martensite state is recovered to its open and recovered austenite state to apply an unfastening force. Hence, in this mode, insertion and removal of a lens is performed when the rim is in the memory configuration corresponding to rim 16 and the lens is held in place by a deformed rim corresponding to rim 14.

Figure 3:
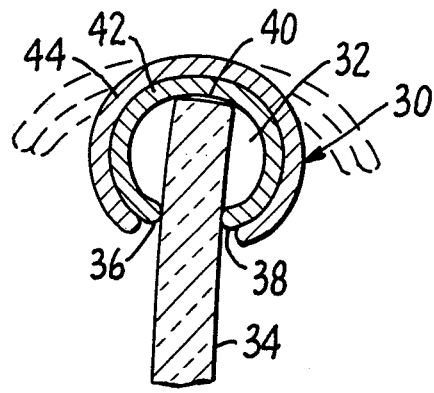
FIG. 3 is a cross-sectional view taken along section lines 3—3 in FIG. 1 of a lens-retaining rim to apply a fastening force with two-way action activated by heat.

Referring now to FIG. 3, a preferred cross-section for a rim 30 according to the invention is shown. The cross-section is C-shaped defining a channel 32 along the length of the rim 30. The channel 32 has a radial dimension which can be selectively increased or decreased to enable release of a lens 34 or retention of the lens 34, respectively. As previously suggested, either release (unfastening) or retention (fastening) can be effectuated by recovery to the memory configuration, the complementary operation being performed by deforming the radial dimension of the rim 30. Deformation of the shape-memory alloy comprising the rim while the alloy is in its martensite state may, if desired, be effected by compressing the channel radially inwardly to reduce the channel radius, the channel width being increased with heating to the austenite state recovery temperatures.

In considering FIG. 3, it should be noted that the lens 34 may be retained (a) solely or primarily by the ridges 36 and 38 of the rim 30 or (b) by the ridges 36 and 38 together with a friction fit against the inner surface 40 of the rim 30.

As shown in FIG. 3, the rim 30 comprises an inner layer 42 and an outer layer 44. The inner layer 42 is shown having the ridges 36 and 38 disposed therealong. It is also within the scope of the invention to provide retaining ridges along the outer layer 44. In this later embodiment, the C-shape circumference of the outer layer 44 would be relatively greater than the circumference of the inner layer 43. Similarly, engaging the lens 34 by both layers 42 and 44 is also contemplated. In any of the above embodiments either the inner layer 42 or outer layer 44 may be fabricated from a shape-memory alloy depending upon whether the shape-memory alloy is being used to open or to close the C-shaped channel as will become apparent from the following discussion. The other layer is then preferably stainless steel or some other relatively spring-like metal. When the outer layer 44 is shape-memory alloy, the rim 34 preferably closes upon heating to engage the lens 34. When the inner layer 42 is shape-memory alloy, the rim 30 opens to disengage the lens 34 upon heating to the memory (recovered) configuration. Accordingly, by dipping rim 30 into hot water, the wearer or practitioner is able to remove and replace the lens 34 which is engaged upon cooling. It should be recognized that the C-shape cross-section may be provided in a closed rim (e.g. see FIG. 1) or partial rim embodiment.

Figure 4:
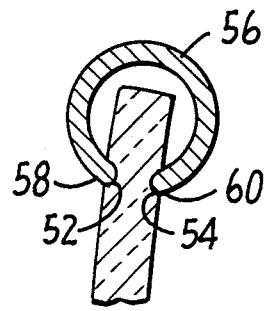
FIG. 4 is a cross-sectional view similar to FIG. 3 of an alternate embodiment.

The rim may comprise just a single layer of shape-memory material as seen in FIG. 4 if desired.

FIG. 4 also illustrates in cross-section a lens 50 having grooves 52 and 54 formed in opposite sides of the lens about its periphery. A C-shaped frame member 56 is disposed about the periphery of the lens and has terminal ends 58 and 60 seated in the grooves 52 and 54, respectively. In this embodiment the shape memory alloy frame member 56 applies a fastening force when the alloy is in the austenite state.

A two-piece rim such as illustrated in FIG. 3 may be employed, but preferably a single-piece rim of shape-memory alloy is employed. Elasticity is not a major factor in such an application but strength is, and the grooves permit a secure hold on the lens.

It should be realized that the C-shaped cross-section of the rim 56 need not be circular as illustrated, but may be an alternate shape, e.g. U-shaped, which would function similarly. It is also within the scope of the invention to have the rims expand and contract circumferentially. In FIG. 1 the rim 16 is shown to be circumferentially expanded with respect to rim 14.

Figure 5:
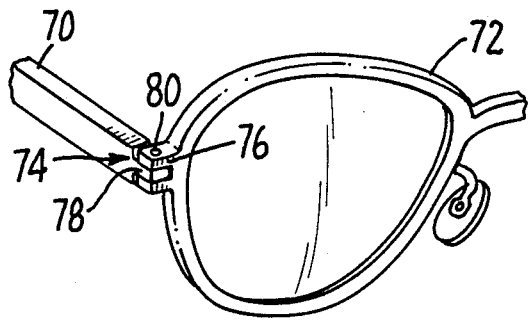
FIG. 5 is a partial cross-sectional view of an eyeglass frame temple pivotally coupled to a rim by a fastener portion thereof.

Referring now to FIG. 5, the fastening of an eyeglass frame temple 70 to an eyeglass frame rim 72 with a fastener portion shown generally at 74 is detailed. The fastener portion 74 comprises a shape-memory alloy member 76 having a U-shaped cross-section which extends from the rim 72. Positioned within the U-shaped portion of member 76 is the end portion 78 of the temple 70. Pin 80 enables the temple 70 and the member 76 to be pivotally coupled when the member 76 is closed in the U-shape as shown in FIG. 5. The member 76 is shown in its memory configuration, i.e. when the alloy is in its recovered austenite state. It is understood that the member 76 will remain in this memory configuration even if it is cooled to its martensite state and may function in that condition. The member 76 may be deformed by spreading arms which comprise the U-shape apart from each other in its deformable martensite state, which depending on the specific alloy and transformation temperature may be at a cold temperature. Below the transition temperature the temple 70 is thus uncoupled from the member 76. The temple 70 can be pivotally re-coupled by the member 76 when the alloy of the member 76 is in its recovered austenite state. In such an embodiment, a shape-memory member is employed and recovered to the initial position by heat which may be room temperature.

Figure 6:
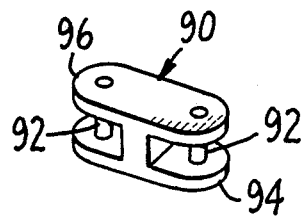
FIGS. 6, 7, 9 and 10 are exploded partial perspective views of various embodiments of shape memory alloy fasteners employable in coupling a temple to a rim as in FIG. 5.

In FIG. 6, a dual open-ended fastener is shown generally at 90 having an H-shaped cross-section. Pins 92 are located at each end of the fastener 90. At least one end 96 of the fastener 90 is deformable to open the space between the arms of that end of the H-shaped cross-section and is recoverable by heating to a transition recovery temperature. Fastener 90 may be used in an application like that shown in FIG. 5 to connect a temple 70 and an eyeglass frame rim (not shown).

Figure 7:
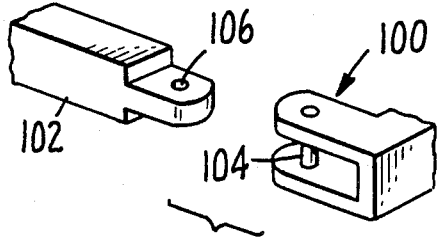
Figure 8:
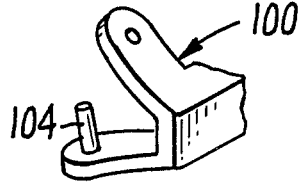
FIG. 8 is a perspective view of the fastener of FIG. 7 in the opened configuration.

The operation of the fastener 90 of FIG. 6 is similar to that of a single open-ended fastener shown generally at 100 in FIGS. 7 and 8. In FIG. 7, the single open-ended shape-memory fastener 100 is shown closed adjacent temple end portion 102. Pin-like portion 104 is capable of extending through aperture 106 in the temple end portion 102, thereby forming a pivotal coupling. In FIG. 8, the fastener 100 is open to permit the insertion or removal of a temple end portion.

The scope of the invention is not limited to a single pin such as pin 104, but also included is the concept of two half pins (not shown) one half which may extend from each arm of the U-shaped fastener 100 to engage an aperture such as 106 in temple portion 102. Also, both members, the temple and frame member, may be yokes with opposed pins, or hemispheres, engaging opposed holes in the other member.

Figure 9:
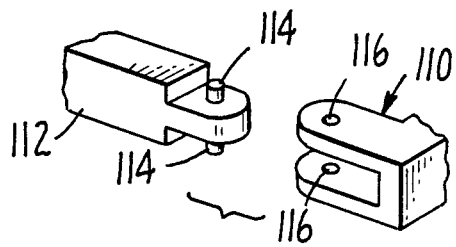

FIG. 9 illustrates another type of fastener shown generally at 110. Rather than having a pin 104 as in FIG. 7, temple end portion 112 has two half pins 114 extending therefrom which are receivable in complementary openings 116 in U-shaped member 110. As in the embodiments of FIGS. 7 and 8, member 110 made of shape-memory alloy can similarly open and close to provide a pivotal coupling.

Figure 10:
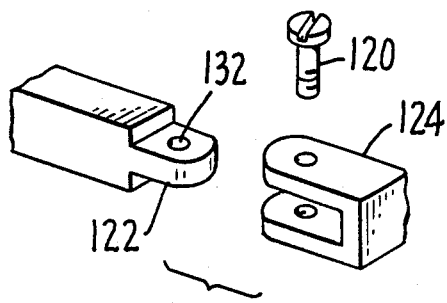

In FIG. 10 a pivotal coupling is achieved by means of a stud or screw made from shape-memory alloy. The screw 120 is twisted, or if a stud is pushed easily, into complementary apertures in a temple end portion 122 and a non-shape memory U-shaped element 124 when aligned. When recovered, the screw or stud 120 expands to tightly engage the U-shaped element 124. It is understood that element 124 may be a separate element as shown or may be a portion of the rim such as member 76 shown in FIG. 5.

Figure 11:
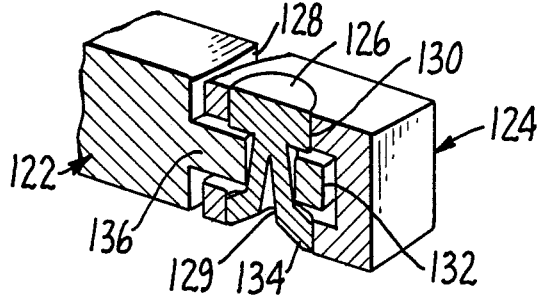
FIG. 11 is a partial cross-sectional view of a fastener employable in the embodiment of FIG. 10.

If the element 120 is a stud, it may take the form of the stud of FIG. 11. The stud 120 has a head portion 126 seated in a recess 128 in the member shown generally at 122. A split shank 129 extends from head 126 through a hole 130 in member shown generally at 124 and through aligned hole 132 in the end member shown generally at 122 of the temple. The end of the stud 120 has short outwardly extending lip 134 which catches on the surface of a shoulder 136 in the bottom leg of the U-shaped member 124.

When it is in its deformed martensite state, the member 120 which is radially compressed slips readily through the aligned holes in the temple 122 and U-shaped member 124. When expanded the lip 134 locks in the recess 136 and also engages the side walls of the temple and lower U-shaped member to lock the members together.

In FIG. 12, a fastener in the form of a bolt and nut assembly is shown generally at 140 to provide fastening for a lens 142 to an eyeglass rim or other member. As shown therein, the bolt 144 extends through a rim 146 and the lens 142 and engages a complementary nut 148. The bolt 144 and/or the nut 148 are made from shape-memory alloy material. When the bolt 144 is made of shape-memory alloy, it is preferably deformed by being axially elongated and therefore radially compressed in its martensite state prior to being inserted into the nut 148. When the nut is made of shape-memory alloy, it is preferably deformed by being expanded radially before the bolt 144 is inserted therein. When recovered the shape-memory alloy bolt 144 contracts longitudinally and expands radially. The nut shape-memory alloy 148 contracts radially to effect tight coupling therebetween. The magnitude of contraction and/or expansion is readily controlled by the predefined memory configuration of the bolt 144 and/or nut 148. These elements may also be recessed.

An alternative for securing a lens to a rim is illustrated in FIGS. 13 and 14 wherein relatively small arcuate rim members are provided which clamp each individual lens at the temples and at the nose piece. Specifically, shape memory members 150 and 152 are preferably square C-shaped in cross-section and arcuate to conform to the circumferential curvature of lenses 154 and 156, respectively. Members 150 and 152 may be integral with the entire bridge of the eyeglasses. The lenses are preferably grooved as noted with respect to the embodiment of FIG. 4 to mate with the ends of the C-shaped members.

Referring again to FIG. 13, temples 158 and 160 are secured via hinges 162 and 164, to the lens 154 and 156, by members 166 and 168 which are substantially identical to members 150 and 152, except for the hinge pieces. The method of connection to the lens is also identical. No temple or nose pads and wires are shown but are considered to be within the scope of the invention. The various members 150, 152, 166 and 168 are greatly enlarged in the drawings for purposes of clarity of illustration but in reality provide a substantially rimless eyeglass of sturdy construction and yet with the ability to readily replace defective parts. FIG. 14 illustrates in cross-section an alternative to grooving the lens wherein a lens such as lens 154 is cut away on each side thereof at the edge of the lens to accommodate gripping by shape-memory alloy element 150.

FIG. 15 shows an eyeglass frame generally at 170 having shape memory rims 172 and 174 which contract radially inwardly in cantilever fashion at the far ends thereof when heated to a recovery temperature. As the rims 172 and 174 decrease in radius upon recovery, lenses 176 and 178 inserted therein are engaged by the rims 172 and 174 and, also temples 180 and 182 are pivotally engaged. Specifically, protrusions 184, 186, 188 and 190 enter depressions or holes in the temples 180 and 182, respectively.

Further in regard to FIG. 15, it is noted that the temples 180 and 182 may be made from shape-memory alloy, stainless steel or some other metal when coupled to the rims 172 and 174 with a hined joint as shown.

Alternatively, the joint may comprise a thin section of shape memory alloy such as Nitinol which has good flexibility and fatigue properties. That is, instead of a multi-piece hinge, pivotal coupling may be achieved by a foldable length of shape memory alloy 201 disposed between each rim 172, 174 and temples 186, 182, respectively as illustrated in FIG. 17. Piece 201 is made of shape-memory alloy with an austenite transformation temperature above ambient temperature wherein below said austenite transformation temperature (i.e. ambient temperatures to which the eyeglasses are exposed in use) the alloy is in its martensite state and is therefore highly flexible and resistant to fatigue.

Turning now to FIGS. 16, nose rest 21 is shown coupled to a rim 16 by a nose pad wire 25 which is connected to rim 16. Nose pad 21 may be tightly coupled to nose pad wire 25 by a shape memory alloy fastener 27. The fastener 27 is deformable in its martensite state from the configuration shown to enable the fastener to be inserted or removed. When recovered to its austenite state, the fastener 27 encompasses and engages the pad 27. More importantly, the wire 25 may, like the temples 20 and 22 and the bridge 18 shown in FIG. 1, be made of shape-memory alloy which is resistant to permanent deformation or kinking over the full range of ambient temperatures. The wires may alternatively be formed from shape-memory alloy which is sufficiently resistant to deformation and which is readily restorable to its undeformed shape by heating.

Referring more specifically to FIG. 17, there is illustrated a hinge for the temple frame connection. In this modification, both the end 200 of the temples 202 and an extension 204 from frame 206 have deep recesses 208 and 210, respectively to accommodate piece 201. The hinge piece 201 could also be riveted to the frame and temple. The temples may also advantageously employ shape-memory alloy as previously described.

Referring now specifically to FIG. 18, a cross-section of a temple shown generally at 212 comprises a U-shaped member 214 of shape memory alloy filled with a stiffening insert 216. For extra strength the shape memory alloy member could be an I beam or could have an optional outward decorative ridge, such as ridge 218 illustrated in phantom line. If such configuration is employed, the channel could be eliminated and the whole temple covered in plastic. Further, the channel 214 could have return legs which close about a stainless steel or similar stiffening insert to form an elastic member having memory. The insert 216 may thus be a thin blade of material which adds strength to the structure but which is not strong enough to defeat the memory effect of the memory material.

Other improvements, modifications and embodiments will become apparent to one of ordinary skill in the art upon review of this disclosure. Such improvements, modifications and embodiments are considered to be within the scope of this invention as defined by the following claims.

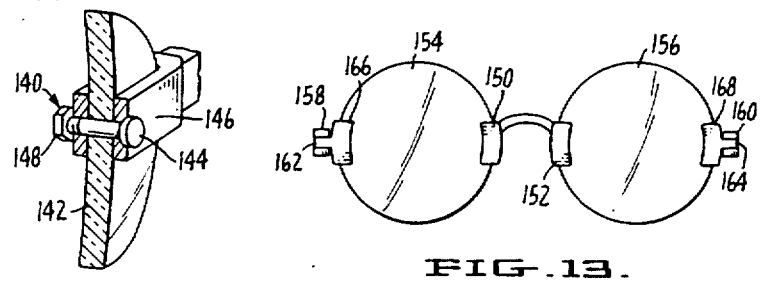

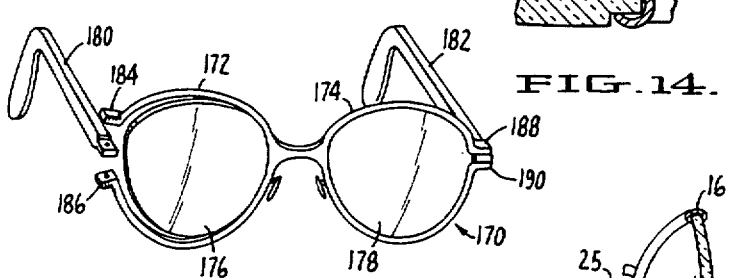

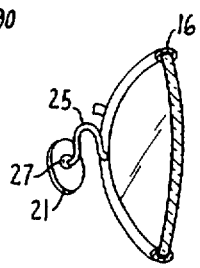

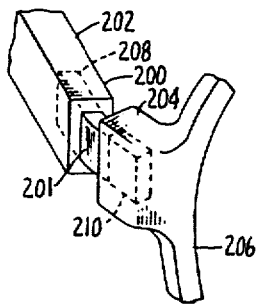

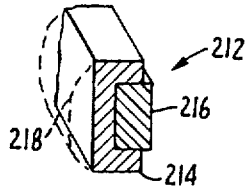

What is claimed is:

1. An eyeglass frame having at least one frame component, said frame component having a generally U- or C-shaped cross-section, said frame component made of shape-memory alloy with a martensite transformation temperature below ambient temperature, said alloy having an austenite transformation temperature above which the alloy transforms to its austenite state to change the U- or C-shaped opening within said cross-section with respect to a substrate that may be inserted therein.

2. An eyeglass frame as in claim 1 wherein said eyeglass frame includes a pair of rims and a pair of temples, said frame components comprising the connection between a respective temple and a respective rim.

3. An eyeglass frame as in claim 2 wherein said connection between a temple and a rim comprises a U-shaped piece of shape-memory alloy when said alloy is in said austenite state, said shape capable of being deformed to open the U-shape when said alloy is in said martensite state.

4. An eyeglass frame as in claim 1 wherein said frame includes a pair of rims, said rims having a generally C-shaped cross-section, said frame components comprising said rims and said rims being C-shaped when said alloy is in its austenite state, said C-shape capable of being opened when said alloy is in its martensite state.

5. An eyeglass frame as in claim 4 wherein each of said rims comprises an outer layer and an inner layer, each rim having a C-shaped cross-section, said inner layer mounted concentrically within said outer layer, one of said layers being made of shape-memory alloy and the other layer being made of spring-like material capable of exerting a force against said shape-memory alloy layer, said shape-memory alloy layer capable of overcoming said force when the shape-memory alloy layer is in its austenite state.

6. An eyeglass frame having a pair of time and a pair of corresponding temples, said rims connected to said temples by a pair of hinge portions, each of said hinge portions including a piece of shape-memory alloy which is capable of being bent in hinge-like fashion, said piece made of shape-memory alloy with an austenite transformation temperature above ambient temperature, below said austente transformation temperature said shape-memory alloy being in its martensite state, each said piece being in said martensite state and therefore being highly flexible and resistant to fatigue to accommodate fatigue resistant bending of each said piece.

7. An eyeglass frame having at least one frame component, said frame component having a generally U-or C-shaped cross-section, said frame component made of shape-memory alloy with a martensite transformation temperature above ambient temperature, said alloy having an austenite transformation temperature above which the alloy transforms to its austenite state to change the U- or C-shaped opening within said cross-section with respect to a substrate that may be inserted therein, said alloy maintaining force with respect to a substrate when said alloy returns to its martensite state.

* * * * *

UNITED STATES PATENT AND TRADEMARK OFFICE
CERTIFICATE OF CORRECTION

PATENT NO. : 4,895,438           Page 1 of 2
DATED      : January 23, 1990
INVENTOR(S): Robert B. Zider It is certified that error appears in the above-indentified patent and that said Letters Patent is hereby corrected as shown below:

The drawing sheet, consisting of Figs. 12 - 18, should be added as shown on the attached page.

Signed and Sealed this

Twenty-seventh Day of June, 1995

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 4,895,438　　　　　　　　　　　Page 2 of 2
DATED : January 23, 1990
INVENTOR(S) : Robert B. ZIDER et al.

It is certified that error appears in the above-indentified patent and that said Letters Patent is hereby corrected as shown below: